(12) United States Patent
Russell, II et al.

(10) Patent No.: US 9,165,691 B2
(45) Date of Patent: Oct. 20, 2015

(54) BURNABLE POISON MATERIALS AND APPARATUSES FOR NUCLEAR REACTORS AND METHODS OF USING THE SAME

(75) Inventors: William Earl Russell, II, Wilmington, NC (US); Christopher J. Monetta, Wilmington, NC (US); Lukas Trosman, Wilmington, NC (US)

(73) Assignee: GE-HITACHI NUCLEAR ENERGY AMERICAS LLC, Wilmington, NC (US)

( * ) Notice: Subject to any disclaimer, the term of this patent is extended or adjusted under 35 U.S.C. 154(b) by 674 days.

(21) Appl. No.: 12/385,747

(22) Filed: Apr. 17, 2009

(65) Prior Publication Data

US 2010/0266095 A1 Oct. 21, 2010

(51) Int. Cl.
*G21C 3/00* (2006.01)
*G21G 1/02* (2006.01)
(Continued)

(52) U.S. Cl.
CPC .. *G21G 1/02* (2013.01); *G21C 7/04* (2013.01); *G21G 1/001* (2013.01); *G21G 2001/0094* (2013.01); *Y02E 30/39* (2013.01)

(58) Field of Classification Search
CPC ........... G21C 7/04; G21G 1/001; G21G 1/02; G21G 2001/0094; Y02E 30/39
USPC .......... 376/409, 426, 434, 447, 412, 419, 327
See application file for complete search history.

(56) References Cited

U.S. PATENT DOCUMENTS 3,594,275 A 7/1971 Ransohoff et al.
3,940,318 A 2/1976 Arino et al.
(Continued)

FOREIGN PATENT DOCUMENTS

EP 0107158 B1 8/1988
EP 0817203 B1 11/2001
(Continued)

OTHER PUBLICATIONS

Munter, Alan, Neutron scattering lengths and cross sections [online], Oct. 30, 2003 [retrieved Jul. 21, 2011], National Institute of Standards and Technology, NIST Center for Neutron Research, URL: http://www.ncnr.nist.gov/resources/n-lengths/.*
(Continued)

*Primary Examiner* — Timothy A Brainard
(74) *Attorney, Agent, or Firm* — Harness, Dickey & Pierce, P.L.C.

(57) ABSTRACT

Example embodiments are directed to materials useable as burnable poisons in nuclear reactors, components using the same, and methods of using the same. Example embodiment burnable poison materials produce desired daughter products as they burn out, thereby permitting placement and use for neutronic characteristic improvement and/or neutron flux shielding in locations conventionally barred as uneconomical. Example embodiment burnable poison materials may include natural iridium and enriched iridium-193. Example embodiment components may be fabricated, shaped, and placed to provide desired burnable poison effects in the reactor core in conventional locations and locations not conventionally used due to economic infeasibility. Example methods include use of example embodiment components, including determining locations benefiting from burnable poison effects, fabricating example embodiment components of a desired amount of example embodiment burnable poison materials, placing the example embodiment components, exposing example embodiment components to flux within the operating nuclear reactor, removing and harvesting example embodiment burnable poison components for desired daughter products produced from example embodiment burnable poison materials.

17 Claims, 7 Drawing Sheets

(51) Int. Cl.
*G21C 7/04* (2006.01)
*G21G 1/00* (2006.01)

(56) References Cited

U.S. PATENT DOCUMENTS

| | | | |
|---|---|---|---|
| 3,998,691 A | 12/1976 | Shikata et al. | |
| 4,196,047 A | 4/1980 | Mitchem et al. | |
| 4,284,472 A | 8/1981 | Pomares et al. | |
| 4,462,956 A | 7/1984 | Boiron et al. | |
| 4,475,948 A | 10/1984 | Cawley et al. | |
| 4,493,813 A | 1/1985 | Loriot et al. | |
| 4,532,102 A | 7/1985 | Cawley | |
| 4,597,936 A | 7/1986 | Kaae | |
| 4,617,985 A | 10/1986 | Triggs et al. | |
| 4,663,111 A | 5/1987 | Kim et al. | |
| 4,729,903 A | 3/1988 | McGovern et al. | |
| 4,782,231 A | 11/1988 | Svoboda et al. | |
| 4,859,431 A | 8/1989 | Ehrhardt | |
| 5,053,186 A | 10/1991 | Vanderheyden et al. | |
| 5,145,636 A | 9/1992 | Vanderhevden et al. | |
| 5,355,394 A | 10/1994 | Van Geel et al. | |
| 5,400,375 A | 3/1995 | Suzuki et al. | |
| 5,513,226 A | 4/1996 | Baxter et al. | |
| 5,596,611 A | 1/1997 | Ball | |
| 5,615,238 A | 3/1997 | Wiencek et al. | |
| 5,633,900 A | 5/1997 | Hassal | |
| 5,682,409 A | 10/1997 | Caine | |
| 5,758,254 A | 5/1998 | Kawamura et al. | |
| 5,867,546 A | 2/1999 | Hassal | |
| 5,871,708 A | 2/1999 | Park et al. | |
| 5,910,971 A | 6/1999 | Ponomarev-Stepnoy et al. | |
| 6,056,929 A | 5/2000 | Hassal | |
| 6,160,862 A | 12/2000 | Wiencek et al. | |
| 6,192,095 B1 | 2/2001 | Sekine et al. | |
| 6,233,299 B1* | 5/2001 | Wakabayashi | 376/202 |
| 6,445,759 B1 | 9/2002 | Hiraiwa et al. | |
| 6,456,680 B1 | 9/2002 | Abalin et al. | |
| 6,678,344 B2 | 1/2004 | O'Leary et al. | |
| 6,751,280 B2* | 6/2004 | Mirzadeh et al. | 376/189 |
| 6,804,319 B1 | 10/2004 | Mirzadeh et al. | |
| 6,895,064 B2 | 5/2005 | Ritter | |
| 6,896,716 B1 | 5/2005 | Jones, Jr. | |
| 7,157,061 B2 | 1/2007 | Meikrantz et al. | |
| 7,232,611 B2* | 6/2007 | Hultquist et al. | 428/472 |
| 7,235,216 B2 | 6/2007 | Kiselev et al. | |
| 2002/0034275 A1 | 3/2002 | Abalin et al. | |
| 2003/0012325 A1 | 1/2003 | Kernert et al. | |
| 2003/0016775 A1 | 1/2003 | Jamriska, Sr. et al. | |
| 2003/0103896 A1 | 6/2003 | Smith | |
| 2003/0179844 A1 | 9/2003 | Filippone | |
| 2004/0091421 A1 | 5/2004 | Aston et al. | |
| 2004/0105520 A1 | 6/2004 | Carter | |
| 2004/0196942 A1 | 10/2004 | Mirzadeh et al. | |
| 2004/0196943 A1 | 10/2004 | Di Caprio | |
| 2005/0105666 A1 | 5/2005 | Mirzadeh et al. | |
| 2005/0118098 A1 | 6/2005 | Vincent et al. | |
| 2006/0062342 A1 | 3/2006 | Gonzalez Lepera et al. | |
| 2006/0126774 A1 | 6/2006 | Kim et al. | |
| 2006/0203952 A1* | 9/2006 | Hettiarachchi et al. | 376/305 |
| 2006/0269036 A1* | 11/2006 | Hanayama et al. | 376/347 |
| 2007/0133731 A1* | 6/2007 | Fawcett et al. | 376/202 |
| 2007/0133734 A1 | 6/2007 | Fawcett et al. | |
| 2007/0297554 A1 | 12/2007 | Lavie et al. | |
| 2008/0031811 A1 | 2/2008 | Ryu et al. | |
| 2008/0076957 A1 | 3/2008 | Adelman | |
| 2008/0112529 A1* | 5/2008 | Pabis et al. | 376/264 |
| 2014/0307844 A1* | 10/2014 | Russell et al. | 376/412 |

FOREIGN PATENT DOCUMENTS

| | | |
|---|---|---|
| GB | 2144899 A | 3/1985 |
| JP | S59104594 A | 6/1984 |
| JP | 59133348 A | 7/1984 |
| JP | S61147183 A | 7/1986 |
| JP | H1010257 A | 1/1998 |
| JP | 2000298187 A | 10/2000 |
| RU | 2100851 C1 | 12/1997 |

OTHER PUBLICATIONS

Kiseliov L.V., "Methods of Obtaining Radioactive Nuclides in Nuclear Reactors," Nuclear Power, 1990 pp. 15-17, 42, 66-67, 73-79, 100, 146), Moscow.

English Translation of RU Office Action issued in connection with corresponding RU Patent Application No. 2010115091/07(021358) dated Sep. 5, 2013.

English Translation of JP Office Action issued in connection with corresponding JP Patent Application No. 2010-093626 dated Dec. 3, 2013.

Search Report and Written Opinion from corresponding EP Application No. 10160137.5-2208 dated Jan. 4, 2013.

Francis, W. C. et al., "Progress Report on Fuel Element Development and Associated Projects", AEC Research & Development Report Metallurgy and Ceramics, vol. IDO-16574, pp. 3-151, Aug. 16, 1960, XP002689034.

Toth, Geza "A Novel Target for Reactor-produced <193m>Pt",International Journal of Applied Radiation and Isotops, vol. 31, No. 7, pp. 411-413, Jul. 1, 1980, XP022598953.

* cited by examiner

BURNABLE POISON MATERIALS AND APPARATUSES FOR NUCLEAR REACTORS AND METHODS OF USING THE SAME

BACKGROUND

1. Field

Example embodiments and methods generally relate to materials and components used in reactors of nuclear power plants.

2. Description of Related Art

Generally, nuclear power plants include a reactor core having fuel arranged therein to produce power by nuclear fission. A common design in U.S. nuclear power plants is to arrange fuel in a plurality of fuel rods bound together as a fuel assembly, or fuel bundle, placed within the reactor core. Power is generated by the nuclear fuel, typically uranium, through a fission chain reaction of the fuel atoms.

Steady-state fission in the reactor fuel releases large amounts of neutrons, which initiate and sustain the fission chain reaction. Conventionally, managing and maintaining a steady-state fission reaction and corresponding power production and safety standards is achieved by managing the amount of neutrons and neutron flux within the core. Managing neutron flux may achieve several goals, including, for example, maximizing power production, equalizing fuel neutron exposure and fissioning or "burn," minimizing neutron flux peaking, and providing safety margins for safe operation and shut-down of the reactor.

Conventional neutron flux management has several forms. Burnable poisons are one form of neutron flux management conventionally used in nuclear reactors. Burnable poisons typically absorb neutron flux, thereby reducing or "poisoning" fuel reactivity and fission rate, where they are placed. Based on the engineer's knowledge of the reactor core and reactor physics, the engineer can determine areas of the core subject to unwanted amounts of neutron flux at particular points in time during operation and place burnable poisons in those positions. Thus, unwanted flux may be reduced, resulting in a more even and/or safer burn throughout the fuel. Alternatively, burnable poisons may be placed in the core coolant or moderator and reduce reactivity throughout the core, potentially providing easier shut-down of the core and/or reducing reliance on other neutron flux management approaches, such as control rod/blade usage.

Burnable poisons also conventionally have a reduced effect as time passes in an operating core. The more neutrons a particular burnable poison absorbs, the lesser its ability to continue absorbing neutrons. Through this property, burnable poisons may be used to control neutron flux or reactivity at specific time periods subject to unwanted amounts of neutron flux, such as beginning of operating cycles, while having minimal effect at other time periods where the poisoning effect is undesired, such as end of operating cycles.

Conventional burnable poisons include, for example, gadolinium and/or boron compounds. These and related elements have a high absorption cross-section, or probability, for thermal neutron flux commonly found in light water reactors. As the burnable poisons absorb neutrons and lower reactivity, they are converted into other elements with much lower thermal neutron absorption cross-sections, thereby "burning out" over time in the operating core. Gadolinium and/or boron compounds are conventionally fashioned into special rods or fuel additives. In these forms, burnable poisons may be placed at specific axial and radial locations within the core to reduce unwanted levels of neutron flux predicted or experienced at those locations at certain times. Conventional burnable poison elements may be removed from the core and disposed of at the completion of each operating cycle, and new burnable poison elements may be introduced to replace the old, depending on new core characteristics.

SUMMARY

Example embodiments are directed to materials useable as burnable poisons in nuclear reactors. Example embodiment burnable poison materials may absorb neutron flux, or reduce reactivity, at desired positions within an operating nuclear reactor. Example embodiment materials may have a substantially reduced absorption effect with increased exposure to neutron flux. Example embodiment burnable poison materials produce desired daughter products as they burn out, thereby permitting placement and use for neutronic characteristic improvement and/or neutron flux shielding in locations conventionally barred as uneconomical. Example embodiment burnable poison materials may include natural iridium and enriched iridium-193, for example.

Example embodiments include fuel components and/or other reactor components fabricated from and/or containing a desired amount of example embodiment burnable poison materials. Example embodiments may be fabricated, shaped, and placed to provide desired burnable poison effects in the reactor core in conventional locations and locations not conventionally used due to economic infeasibility.

Example methods include use of example embodiment components, including determining locations benefitting from burnable poison effects, fabricating example embodiment components of a desired amount of example embodiment burnable poison materials, placing the example embodiment components, exposing example embodiment components to flux within the operating nuclear reactor, removing example embodiment burnable poison components from the core, and/or harvesting example components for desired daughter products produced from example embodiment burnable poison materials.

BRIEF DESCRIPTIONS OF THE DRAWINGS

Example embodiments will become more apparent by describing, in detail, the attached drawings, wherein like elements are represented by like reference numerals, which are given by way of illustration only and thus do not limit the example embodiments herein.

DETAILED DESCRIPTION

Figure 1:
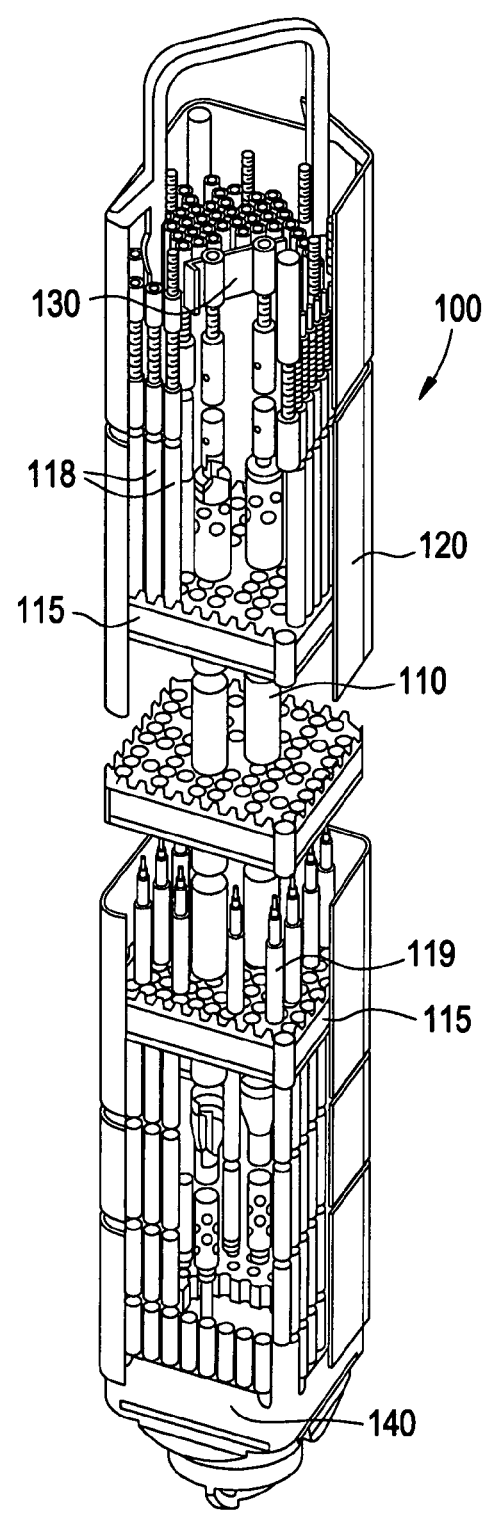
FIG. 1 is an illustration of an example fuel assembly having example embodiment burnable poison components.

Detailed illustrative embodiments of example embodiments are disclosed herein. However, specific structural and functional details disclosed herein are merely representative for purposes of describing example embodiments. The example embodiments may, however, be embodied in many alternate forms and should not be construed as limited to only example embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected," "coupled," "mated," "attached," or "fixed" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a," "an," and "the" are intended to include the plural forms as well, unless the language explicitly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Example embodiments may use unconventional elements as burnable poisons for commercial or other nuclear reactors and may unexpectedly produce desired elements and isotopes thereof as they are used. Daughter products produced from burnt conventional burnable poisons may be of low value and/or chemically/radioactively unsafe, but example embodiments may produce daughter isotopes and elements produced that instead have value and significant other utility. For example, an example embodiment burnable poison made of iridium may produce platinum through exposure to and absorption of neutron flux. The produced platinum may have increased value and alternative industrial applications and may not be dangerous and/or need to be disposed of, like conventional burnable poisons.

Because of the increased and unrecognized utility of example embodiment burnable poisons and the desired materials produced therefrom, example embodiment burnable poisons may be placed at positions in a nuclear reactor not conventionally utilized for conventional burnable poisons, because of the cost of such placement and/or disposal requirements of conventional burnable poisons. Such example placement may benefit neutronic characteristics of a nuclear reactor using example embodiment burnable poisons and produce additional desired materials.

Example Burnable Poisons

Example embodiment burnable poisons appreciably absorb neutron flux, including thermal neutron flux, commonly found in operating nuclear reactors. After sufficient exposure to the operating nuclear reactor, example burnable poisons convert to materials having substantially lower cross sections and do not appreciably absorb further neutron flux. The resulting materials possess other utility or value outside the reactor, and may be harvested for such use and/or value.

Example embodiment burnable poisons may include natural iridium. Iridium is a hard metal resistant to corrosion that may be directly exposed to operating reactor conditions and sufficiently maintain its geometric characteristics so as to be used without shielding or containment within an operating nuclear reactor. Natural iridium includes stable isotopes iridium-191 (~37% abundance) and iridium-193 (~63% abundance). Iridium-191 has a thermal neutron cross section of about 750 barns and will undergo the following reaction when exposed to neutron flux in conventional light water nuclear reactors:

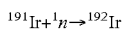
$$^{191}Ir + {}^{1}n \rightarrow {}^{192}Ir$$

The produced iridium-192 is unstable and beta decays into platinum-192 with a half-life of approximately 74 days as such:

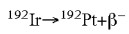
$$^{192}Ir \rightarrow {}^{192}Pt + \beta^{-}$$

The resulting platinum-192 is stable and has a cross section of approximately 14 barns which is less than one-tenth the cross-section of the parent example embodiment burnable poison iridium-191.

The other natural iridium isotope, iridium-193, has a thermal neutron cross section of approximately 110 barns and will undergo the following reaction when exposed to neutron flux in commercial nuclear reactors:

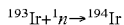
$$^{193}Ir + {}^{1}n \rightarrow {}^{194}Ir$$

The produced iridium-194 is unstable and beta decays into platinum-194 with a half-life of approximately 19 hours as such:

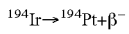
$$^{194}Ir \rightarrow {}^{194}Pt + \beta^{-}$$

The resulting platinum-194 is stable and has a cross section of approximately 1.1 barns, which is less than one-hundredth the cross-section of the parent example embodiment burnable poison iridium-193.

Figure 6:
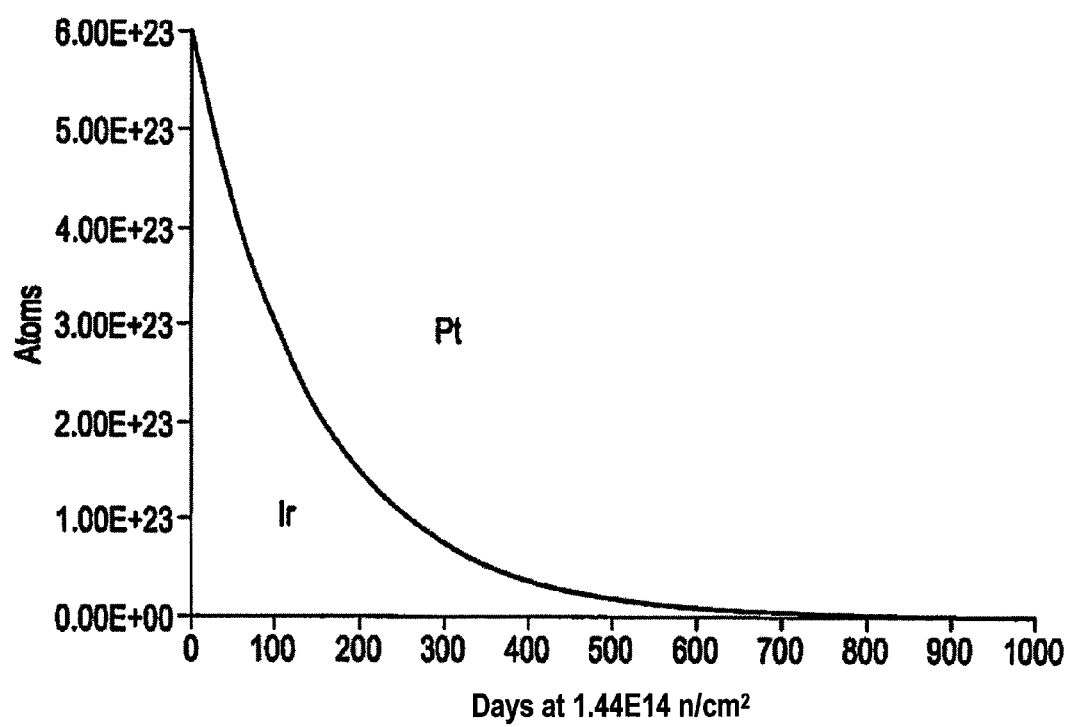
FIG. 6 is a graph of example embodiment burnable poison iridium mass conversion to platinum mass at higher flux rates.

Thus, natural iridium may function as a burnable poison, having a modest neutron absorption effect initially, and depending on the amount of iridium used and the flux of the operating reactor, having a negligible neutron absorption effect at a later point in time, once burnt. The amount and placement of natural iridium may be adjusted, depending on levels and types of flux encountered in the operating nuclear reactor, to produce a desired burnable poison effect, including reducing flux peaking and increasing shutdown margins. FIG. 6 illustrates an example burnable poison—one mole of iridium-191—converted to platinum-192 over the duration of two years within a neutron flux of 1.44E14, which may be a common level of flux encountered in nuclear reactors. As shown in FIG. 6, a substantial portion of the iridium may be converted to platinum within this single two-year cycle. Because several commercial nuclear plants operate with two years between re-loading cycles permitting access to the core and/or harvesting of materials produced therein, iridium may be substantially converted to platinum during commercial operating cycles such that mostly platinum may be harvested from the reactor during re-loading cycles. Example components that may be fabricated from natural iridium are discussed below.

The produced platinum isotopes from example embodiment burnable poison natural iridium are stable and may have significant monetary value and/or industrial application. The produced platinum may be harvested directly from any burnable poison components fabricated out of natural iridium, once the remaining radioactive isotopes have decayed to safe levels of non-radioactive platinum. Alternatively, the platinum isotopes may be immediately harvested from burnable poison components fabricated of natural iridium, before the iridium-192 has decayed to negligibly radioactive levels, through chemical extraction in appropriate facilities having adequate radiation protection, such as hot cells and the like. Additionally, the amount and placement of natural iridium used as an example embodiment burnable poison may be selected to ensure that the all the natural iridium is substantially converted to platinum by the end of a known operating cycle and post-cycle cool-down and fuel handling.

Other example embodiment burnable poisons may include isotopically separated iridium-193. As discussed above, natural iridium is approximately 63% iridium-193, which may be separated through known isotopic separation mechanisms such as centrifugal and gas-diffusion type isotope separation methods, for example. Resulting example embodiment burnable poisons may thus be substantially pure iridium-193.

Pure iridium-193 may possess additional beneficial characteristics as an example embodiment burnable poison. As shown above, iridium-193 has a cross section over 100 times greater than the produced platinum-194 and a half-life on the order of hours. Thus, example embodiment burnable poison components fabricated from pure iridium-193 may have a more significant burnable poison effect and be harvested from nuclear reactors as substantially pure, non-radioactive platinum without requiring substantial decay time and/or chemical separation.

Various phases of materials may be used as example embodiment burnable poisons. It is understood that liquid or gaseous burnable poisons, or burnable poisons generating liquid or gaseous desirable daughter products, may also be used as example embodiment burnable poisons, with appropriate containment for placing and/or harvesting the material and/or product thereof. Solid example embodiment burnable poisons, including natural iridium and iridium-193 discussed above, that produce only solid desired daughter products including platinum, may be formed and used directly as example embodiment burnable poison components, as discussed in the following section.

Example Embodiment Burnable Poison Components

Example embodiment burnable poison components may be fabricated from or contain any of the example burnable poisons discussed above, including natural iridium and/or highly-enriched iridium-193. Example components may be configured and placed in reactor locations benefiting from burnable poison presence, based on the knowledge of one skilled in the art regarding a particular reactor's physical and neutronic characteristics. Example components may be interchangeable with components conventionally found in nuclear reactors and/or may be new or specially designed, based on the material properties of the example burnable poison used and the configuration and needs of the particular reactor. For example, fuel bundle tie plates, extensions, channels, rod content, tubing, water rods, etc. may all be fabricated from or contain example embodiment burnable poisons.

Because example components may be harvested for valuable and/or useable daughter products, including platinum, example components may be placed in areas of the reactor that may benefit from burnable poison presence but are not conventionally used, because of the cost of placement and disposal of conventional burnable poison components. As an example of such a use, example embodiment burnable poison components may be used as local peaking control for fresh fuel components.

FIG. 1 is an illustration of an example fuel assembly 100 having several example embodiment burnable poison components, whose features and effect on a reactor using the bundle 100 are discussed in turn. As shown in FIG. 1, example fuel assembly 100 may include a plurality of full and/or part length fuel rods 118 and 119 arranged in a channel 120. Spacers 115 may provide transverse spacing and positioning among fuel rods 118 and 119. Water rods 110 may provide axial passages for water flow through example bundle 100. Upper tie plate 130 and lower tie plate 140 may provide connection and handling components at either end of example assembly 100.

An example embodiment upper tie plate 130 and/or lower tie plate 140 may be at either end of fuel assembly 100. Example tie plates 130/140 may be fabricated of example burnable poisons. For example, natural iridium or enriched iridium-193 may be used to fabricate example embodiment upper tie plate 130 and lower tie plate 140. Because of the location, example tie plates 130/140 may absorb neutrons and produce a moderate poison effect at the top and bottom of a reactor core including one or more of example fuel assembly 100.

Example embodiment upper tie plate 130 and lower tie plate 140 may include various amounts of example burnable poison in a number of different configurations. Depending on the amount of burnable poison used, example tie plates 130/140 may substantially convert to desired daughter products and absorb fewer neutrons near the completion of the operating cycle, when neutron flux out of the reactor is lower. Thus, particularly at the beginning of an operating cycle, example tie plates 130/140 may reduce the amount of neutron flux to which reactor components at the top and bottom of the core, such as a lower plenum, steam drying equipment, etc., are subjected, enhancing their performance and preventing brittling caused by lengthy exposure to neutron flux.

Figure 5:
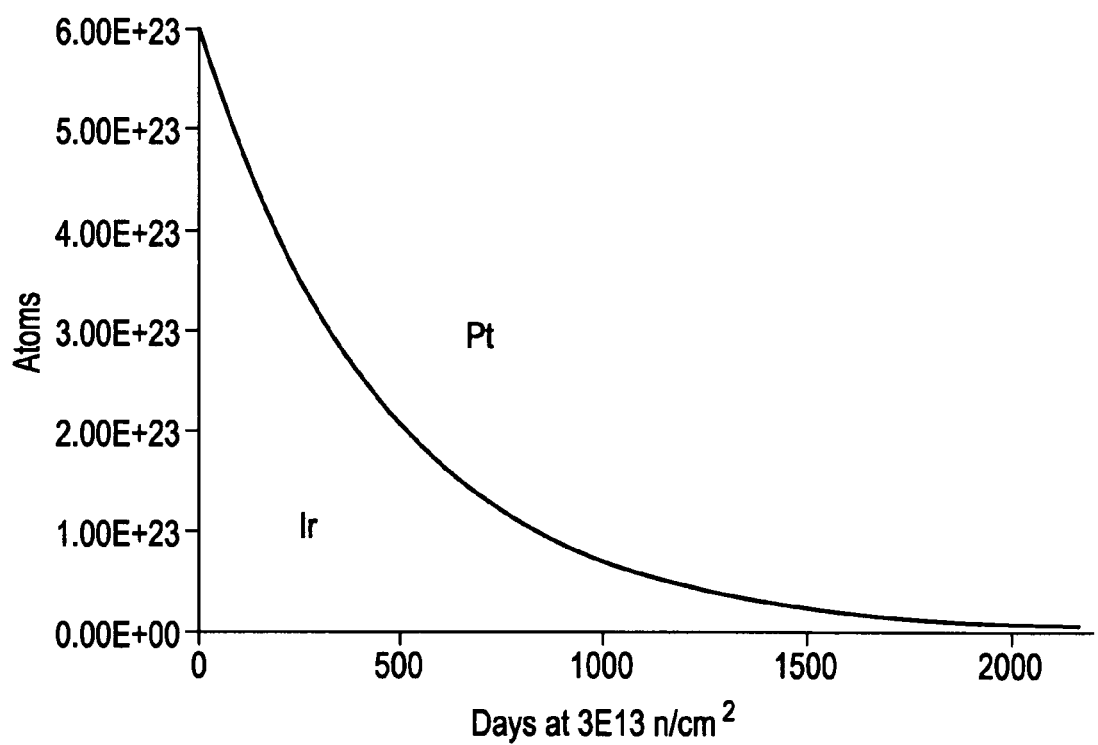
FIG. 5 is a graph of example embodiment burnable poison iridium mass conversion to platinum mass at lower flux rates.

FIG. 5 is a graph of a mole of iridium subjected to neutron flux, $3E13$ n/cm$^2$, typically encountered at the tie plates 130/140 over the course of several years. As shown in FIG. 5, the example embodiments of iridium will be substantially converted to platinum over of approximately six to eight years, which corresponds to the average fuel bundle life in a core of a commercial nuclear reactor. Example embodiment tie plates 130/140 fabricated of iridium may additionally absorb neutron flux from the core and reducing flux, and negative effects of the same, to outside core components.

Similarly, any of the channel 120, spacer 115, water rods 110, and cladding for full length and part length rods 118/119 in FIG. 1 may be example embodiment burnable poison components fabricated out of example embodiment burnable poisons. Based on the neutronic characteristics of a particular reactor core, one skilled in the art may determine what example embodiment components are most effective at meeting operating and/or shielding criteria with a burnable poison and fabricate example bundle 100 out of an appropriate combination of conventional and example embodiment burnable poison components. Individual example embodiment components may be physically configured and contain amounts of example burnable poisons sufficient to meet these operating criteria.

For example, a reactor core may have known flux peaking at particular core positions during operation, and fuel bundles 100 placed at those areas may have additional example components fabricated from example burnable poisons, in order to both reduce the peaking and convert the example components into desired daughter products.

Following operation, example bundle 100 may be removed from the core and harvested for desired daughter products generated from the example embodiment burnable poison components. Such harvesting may require an extended decay time and/or chemical separation in order to isolate and harvest the desired daughter product. For example, if pure iridium-193 is used to fabricate the channel 120 with a thickness and placement within the core sufficient to burn all the iridium-193 into platinum-194, example assembly 100 having example embodiment channel 120 may be removed from the core, and example embodiment channel 120 may be removed from assembly 100 and used shortly thereafter as a platinum-194 source.

Figure 2:
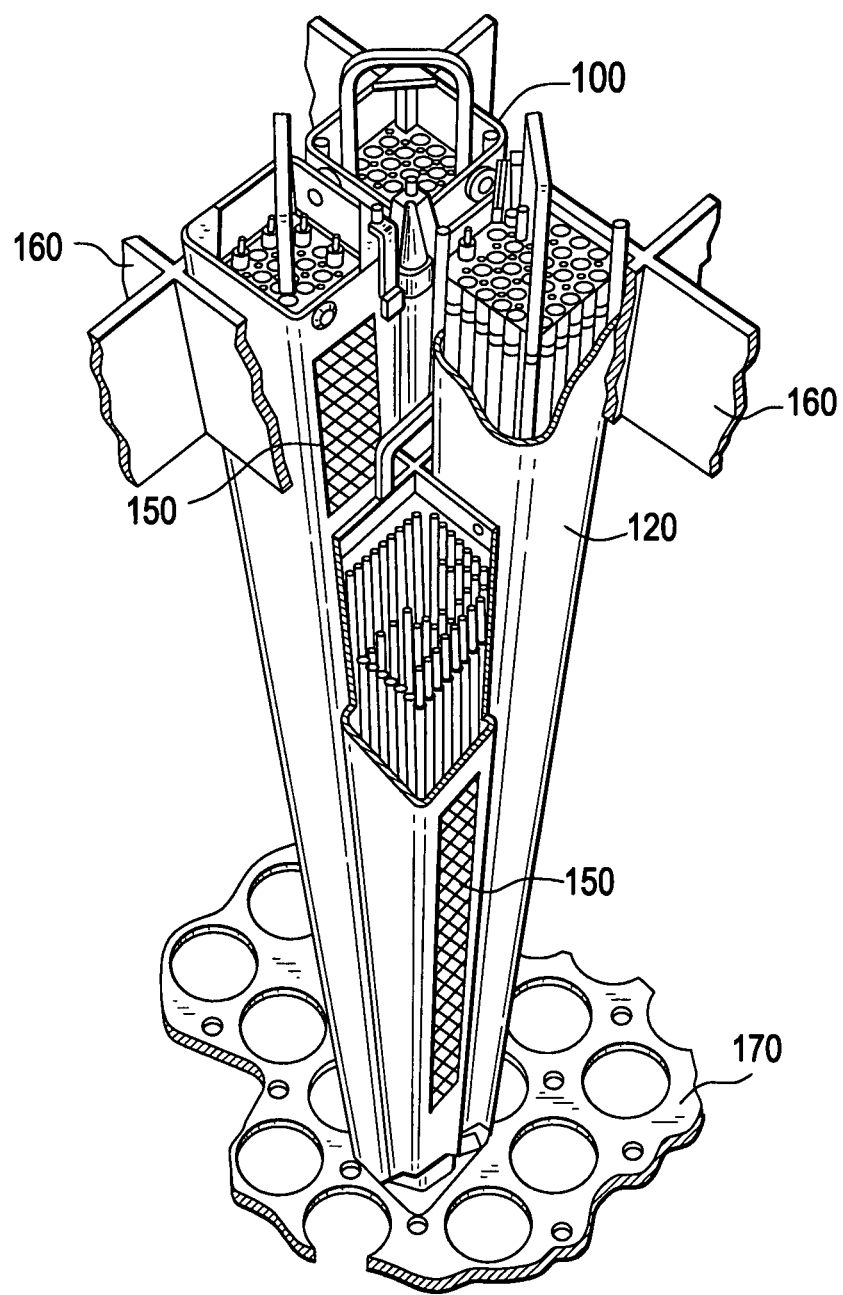
FIG. 2 is an illustration of several example fuel assemblies and example embodiment burnable poison components within a reactor core.

FIG. 2 is an illustration of several example fuel bundles 100 and core components that may be fabricated or contain example embodiment burnable poisons. As shown in FIG. 2, one or more example fuel bundles 100 containing example embodiment burnable poison components may be placed within a reactor core similar to conventional fuel placement. Control rods or cruciform control blades 160 may be placed at alternate bundle corners to absorb neutron flux and control reactivity. Fuel support 170 may support and align bundles 100 within the core.

One or more example embodiment axial blankets 150 may be placed on exterior channels 120 of fuel bundles 100. Axial blankets 150 may be fabricated of example embodiment burnable poisons, including natural iridium and/or enriched iridium-193. Axial blankets may be placed at bundle intersections or other locations that benefit from a burnable poison effect at that location. For example, intersections lacking control blades 160 may be subject to higher flux peaking and resultant uneven burn and lowered shutdown margins at the beginning of a fuel cycle. Example embodiment axial blankets 150 at these positions may lower peaking and/or increase shutdown margins, increasing fuel efficiency and plant safety. Alternatively, the core engineer may model the core or otherwise predict positions benefitting from a burnable poison effect at particular points within a fuel cycle and place example embodiment axial blankets 150 at positions benefitting from a burnable poison effect according to such models or predictions.

Example embodiment axial blankets 150 may further be fabricated of a thickness or other dimension that may provide a desired amount of burnable poison effect. Because example embodiment axial blankets 150 may be fabricated from an example burnable poison, such as iridium-193, that has a greatly reduced effect on neutron flux with increased absorbency of the same, a thicker axial blanket 150 may be used for positions needing increased burnable poison effects. Further, because axial blankets may be geometrically simple, use of iridium, which may be non-ductile and difficult to work, may be most economically feasible in example embodiment axial blankets 150, where extensive working in fabrication would not be required.

Example embodiment axial blankets 150 may be attached directly to fuel bundles 100 via the channel 120 or other fuel component, or axial blankets 150 may be secured to other core components. Following exposure to the operating nuclear reactor and reduction and/or exhaustion of their flux-absorbing capacity, axial blankets 150 may be removed from the core, potentially with the removal of fuel bundles 100, and harvested for desired daughter products generated from example burnable poisons therein, including platinum. FIG. 6 is a graph of a mole of iridium subjected to neutron flux, 1.4E14 n/cm$^2$, typically encountered at axial blankets 150 over the course of approximately 800 days. As shown in FIG. 6, the example embodiment axial blankets 150 using iridium-191 as a burnable poison is substantially to platinum in approximately 800 days of operation, which roughly corresponds to a single, two-year commercial light water reactor fuel cycle.

Similarly, any of the fuel support 170, control blades 160, and/or other non-fuel core components may be example embodiment burnable poison components fabricated out of example embodiment burnable poisons. Based on the neutronic characteristics of a particular reactor core, one skilled in the art may determine what example embodiment components are most effective at meeting operating and/or shielding criteria with a burnable poison and fabricate components 150, 160, 170, etc. out of an appropriate combination of conventional and example embodiment burnable poison components and in appropriate dimensions. Individual example embodiment components may be physically configured and contain amounts of example burnable poisons sufficient to meet these operating criteria.

Figure 3:
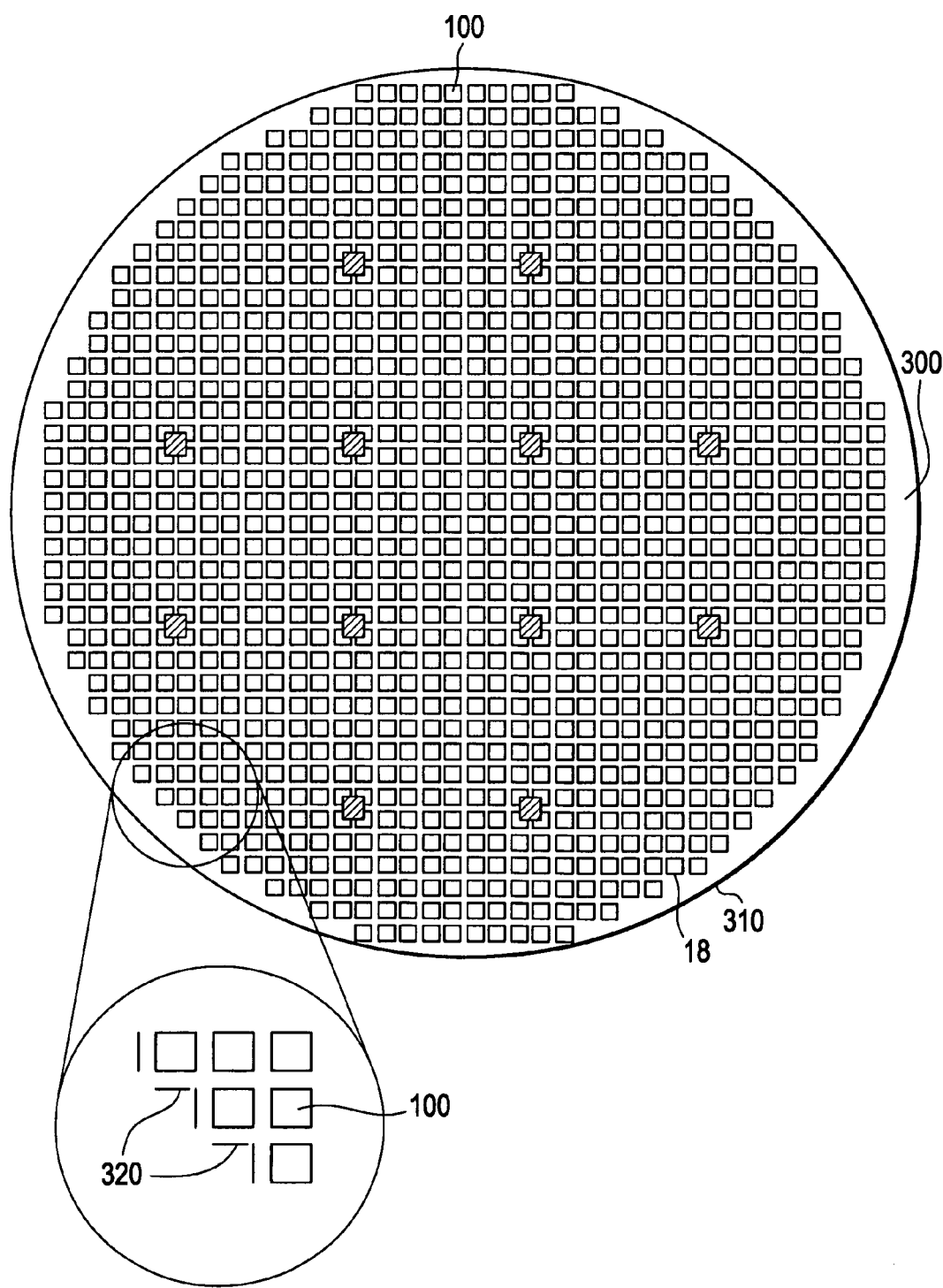
FIG. 3 is an illustration of a reactor core using example embodiment perimeter blankets.

FIG. 3 is an illustration of a cross-section of reactor core 300. Several example fuel bundles 100 and/or other core components fabricated from or containing example embodiment burnable poisons discussed above may be included in reactor core 300. As shown in FIG. 3, one or more example embodiment perimeter blankets 320 containing example embodiment burnable poison components may be placed between fuel bundles 100 and reactor wall/shroud 310. Example embodiment perimeter blankets 320 may be fabricated of example embodiment burnable poisons, including natural iridium and enriched iridium-193. Perimeter blankets 320 may be placed at locations that benefit from a burnable poison effect and/or at positions shielding critical core components from neutron flux. For example, reactor wall 310 may become brittle over time and with exposure to high levels of neutron flux within an operating reactor core 300. Example embodiment perimeter blankets 320 shielding wall 310 may lower neutron-induced brittling, increasing core vessel life and safety. Alternatively, the core engineer may model the core or otherwise predict positions benefitting from a burnable poison effect at particular points within a fuel cycle and place example embodiment perimeter blankets 320 at positions benefitting from a burnable poison effect according to such models or predictions.

Example embodiment perimeter blankets 320 may be fabricated of a thickness or other dimension that may provide a desired amount of burnable poison effect. Because example embodiment perimeter blankets 320 may be fabricated from an example burnable poison, such as iridium-193, that has a greatly reduced effect on neutron flux with increased absorbency of the same, a thicker perimeter blanket 320 may be used for positions needing increased burnable poison effects, including shielding effects. Further, because perimeter blankets 320 may be geometrically simple and use of iridium may be especially economically feasible in example embodiment perimeter blankets 320, where extensive working in fabrication may not be required.

Figure 4:
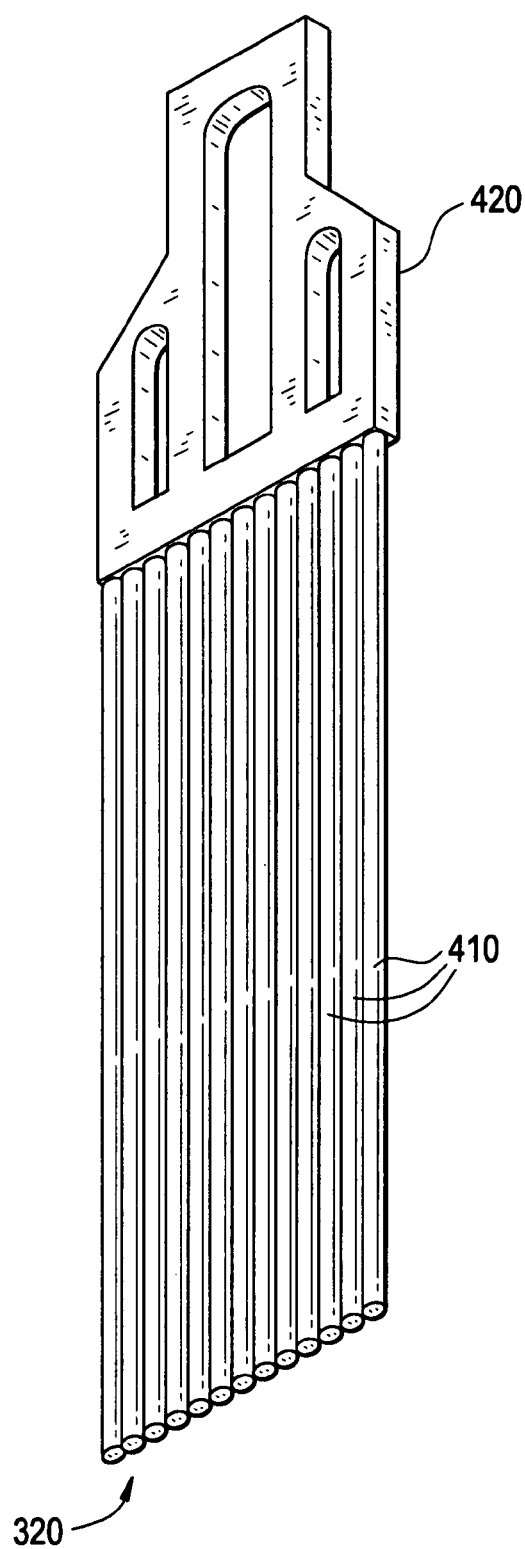
FIG. 4 is an illustration of an example embodiment perimeter blanket.

Example embodiment perimeter blankets 320 may be attached directly to wall 310 and/or fuel bundles 100, or perimeter blankets 320 may be secured to other core components. Example embodiment perimeter blankets 320 may be fabricated into plate-like sheets, either flat or fabricated from a plurality of rods containing example burnable poisons, for example. FIG. 4 is an illustration of an example embodiment perimeter blanket 320 fabricated with burnable poison rods

410. In this example embodiment, the burnable poison rods 410 may be fabricated from hollow tubing containing example burnable poisons, such as natural or enriched iridium. Example embodiment blanket 320 may also include rods 410 that are solid or a solid flat plate. Perimeter blanket 320 may include a handle 420 secured to an end of blanket 320 to enable blade placement, movement, and/or other handling. As discussed with respect to other example embodiments containing example burnable poisons, example embodiment perimeter blankets 320 may be exposed to an operating nuclear reactor and slowly reduce and/or exhaust their flux-absorbing capacity. Example embodiment perimeter blankets 320 may be removed from the core and harvested for desired daughter products generated from example burnable poisons therein, including platinum.

Example Methods

Example burnable poisons and example components containing the same being described, example methods of using the same are now discussed. It is understood that any of the above-discussed example components may be used with example methods, but example methods are not limited thereto. Similarly, it is understood that any of the above-discussed example burnable poison materials and desired daughter products may be used and generated with example methods, but example methods are not limited thereto.

Figure 7:
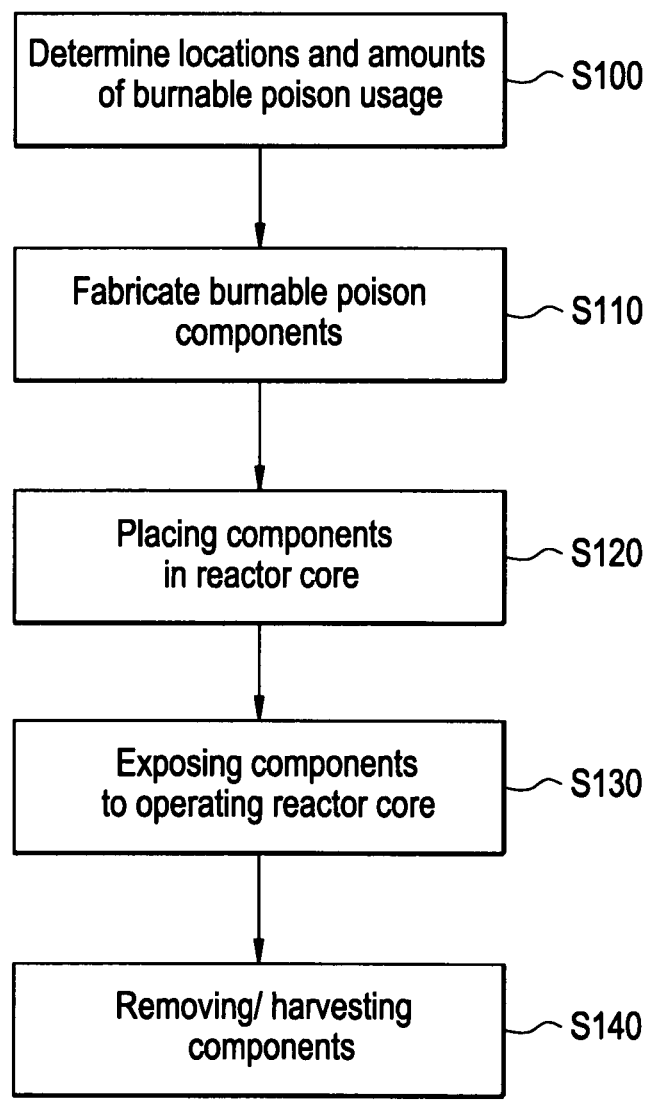
FIG. 7 is a flow chart illustrating example methods for use of example embodiment burnable poison components.

FIG. 7 is a flow chart illustrating example methods. Example methods of using components including example embodiment burnable poisons include determining locations benefiting from burnable poison effects, including flux absorption and/or radiation shielding, in step S100. The determining may include a simulation of core flux amounts based on other core characteristics such as fuel placements and enrichments. Alternatively, the determining may be based on knowledge of one familiar with the core or based on past core performance. Further, in step S100, an amount of example embodiment burnable poison to be used, based on the absorption ability of the poison used, amount of flux to be absorbed, and amount of desired daughter product to be generated, may be determined. Step S100 may be implemented on a processing device or calculated by a core engineer.

In step S110, example embodiment components containing a desired amount of example embodiment burnable poison materials determined in Step S100 may be fabricated. Example embodiment components may closely resemble conventional components that they may replace. Alternatively, example embodiment components may have altered dimensions and/or geometries in order to accommodate the amount of burnable poison to be used as determined in step S100. Example embodiment components may be fabricated wholly from example embodiment burnable poison materials or may include these materials, potentially in containment spaces within the components. Fabrication of example embodiments in step S110 may include known methods of forging, shaping, and otherwise working the material used to fabricate example embodiment components, including example embodiment burnable poisons.

In step S120, the example embodiment components fabricated in Step S110 are placed at the locations determined in step S100 within the core. The placement in step S120 may occur during a fuel outage when the reactor core is accessible at the end of a fuel cycle. Placement may coincide with fuel assembly placement, particularly if example embodiment components are placed within or attached to fuel assemblies.

In step S130, example embodiment components containing example embodiment burnable poisons may be exposed to flux within the operating nuclear reactor. Step S130 may include example embodiments providing the desired burnable poison effect within the operating core and generating desired daughter products as a result of such exposure.

In step S140, example embodiment burnable poison components may be removed and/or harvested for desired daughter products produced from the exposure in step S130. Removal in step S140 may occur during a fuel outage or another time when the reactor core is accessible, and may occur simultaneously with fuel shuffling/removal. Harvesting desired daughter products may include allowing example embodiment components to decay to safe radioactive levels or chemically separating desired products from other undesired and/or radioactive products.

Because example embodiments and methods provide burnable poison effects and generation of desired daughter products at positions and in amounts and purities not possible in conventional fuel bundles and core components, example embodiments may permit more favorable reactor core neutronic characteristics, shielding, and safety with reduced operating costs due to the value of produced daughter products.

Example embodiments and methods thus being described, it will be appreciated by one skilled in the art that example embodiments may be varied through routine experimentation and without further inventive activity. For example, example embodiments and methods may be discussed with reference to features and components conventionally found in US commercial light-water reactors for electrical power generation; however, example embodiments and methods may be useable with a variety of different types of reactors found worldwide. Variations are not to be regarded as departure from the spirit and scope of the exemplary embodiments, and all such modifications as would be obvious to one skilled in the art are intended to be included within the scope of the following claims.

What is claimed is:

1. A method of operating a nuclear reactor, the method comprising:

fabricating a burnable mechanical reactor component wholly of iridium as a burnable poison, the burnable mechanical reactor component being configured to substantially convert to only platinum after being exposed to neutron flux in the operating nuclear reactor, the burnable mechanical reactor component having a neutron cross section at least ten times larger than platinum, the burnable mechanical reactor component closely resembling an existing mechanical reactor component in the nuclear reactor, the existing mechanical reactor component being at least one of a tie plate, cladding, fuel assembly, fuel bundle, fuel rod end plug, tubing, water rod, spacer, channel, control rod, control blade, fuel support, axial blanket, perimeter blanket; and replacing the existing mechanical reactor component with the burnable mechanical reactor component.

2. The method of claim 1, wherein the axial blanket is attached to the channel of the fuel assembly, and the perimeter blanket is disposed between a core of the nuclear reactor and a wall of a vessel of the nuclear reactor.

3. The method of claim 1, further comprising:

directly exposing the burnable mechanical reactor component to operating conditions within the nuclear reactor without shielding or containment of the burnable mechanical reactor component.

4. The method of claim 1, wherein the method of operating includes burning out the burnable mechanical reactor component to produce desired daughter isotopes.

5. A method of operating a nuclear reactor, the method comprising:
fabricating at least one burnable mechanical reactor component wholly of a burnable poison such that the at least one burnable mechanical reactor component includes an amount of burnable poison and is configured to be placed in a location in the nuclear reactor, the at least one burnable mechanical reactor component being configured to substantially convert to only platinum after being exposed to neutron flux in the operating nuclear reactor, the at least one burnable mechanical reactor component having a neutron cross section at least ten times larger than platinum, the at least one burnable mechanical reactor component closely resembling an existing mechanical reactor component in the location, the existing mechanical reactor component being at least one of a tie plate, cladding, fuel assembly, fuel bundle, fuel rod end plug, tubing, water rod, spacer, channel, control rod, control blade, fuel support, axial blanket, perimeter blanket;
placing the at least one burnable mechanical reactor component in the location to replace the existing mechanical reactor component;
exposing the at least one burnable mechanical reactor component to the nuclear reactor while operating;
removing the at least one burnable mechanical reactor component from the nuclear reactor; and
harvesting desired products from the at least one burnable mechanical reactor component, the desired products being created from the exposing step.

6. The method of claim 5, further comprising:
determining the location within the nuclear reactor for placement of the burnable poison and the amount of burnable poison to be used, the determining based on at least one of a neutronics characteristics of the reactor, radioactive shielding characteristics of the reactor, and a neutronics characteristics of the burnable poison.

7. The method of claim 6, wherein the determining step determines the amount of burnable poison to be used such that substantially all of the burnable poison is converted to the desired products within an operating cycle of the nuclear reactor.

8. The method of claim 5, wherein the nuclear reactor is a commercial nuclear reactor and wherein the exposing step includes commencing commercial electrical generation in the nuclear reactor.

9. The method of claim 5, wherein the harvesting includes at least one of allowing the desired products to become stable after the exposing step and chemically extracting the desired products after the removing step.

10. The method of claim 5, wherein the burnable poison is at least one of natural iridium and pure iridium-193 and wherein the desired products include platinum.

11. The method of claim 5, wherein the burnable poison is iridium-191 and the desired products include platinum-192.

12. The method of claim 5, wherein the burnable poison is iridium-193 and the desired products include platinum-194.

13. A burnable mechanical reactor component for use in a nuclear reactor, comprising:
a burnable poison that substantially converts to only platinum after being exposed to neutron flux in the operating nuclear reactor, the burnable poison having a neutron cross section at least ten times larger than platinum, the burnable mechanical reactor component being fabricated wholly from the burnable poison, the burnable mechanical reactor component closely resembling an existing mechanical reactor component in the nuclear reactor, the burnable mechanical reactor component configured as a replacement for the existing mechanical reactor component, the existing mechanical reactor component being at least one of a tie plate, cladding, fuel assembly, fuel bundle, fuel rod end plug, tubing, water rod, spacer, channel, control rod, control blade, fuel support, axial blanket, perimeter blanket.

14. The burnable mechanical reactor component of claim 13, wherein the axial blanket is attached to the channel of the fuel assembly, and the perimeter blanket is disposed between a core of the nuclear reactor and a wall of a vessel of the nuclear reactor.

15. The burnable mechanical reactor component of claim 13, wherein the burnable mechanical reactor component has a mass and is configured to be placed at a location within the nuclear reactor based on at least one of a neutronics characteristics of the reactor, radioactive shielding characteristics of the reactor, and a neutronics characteristics of the burnable poison.

16. The burnable mechanical reactor component of claim 15, wherein the mass of burnable poison is such that substantially all of the burnable poison is converted to platinum within an operating cycle of the nuclear reactor.

17. The burnable mechanical reactor component of claim 13, wherein the burnable poison is pure iridium-193.

* * * * *